Patented Nov. 17, 1931 1,832,033

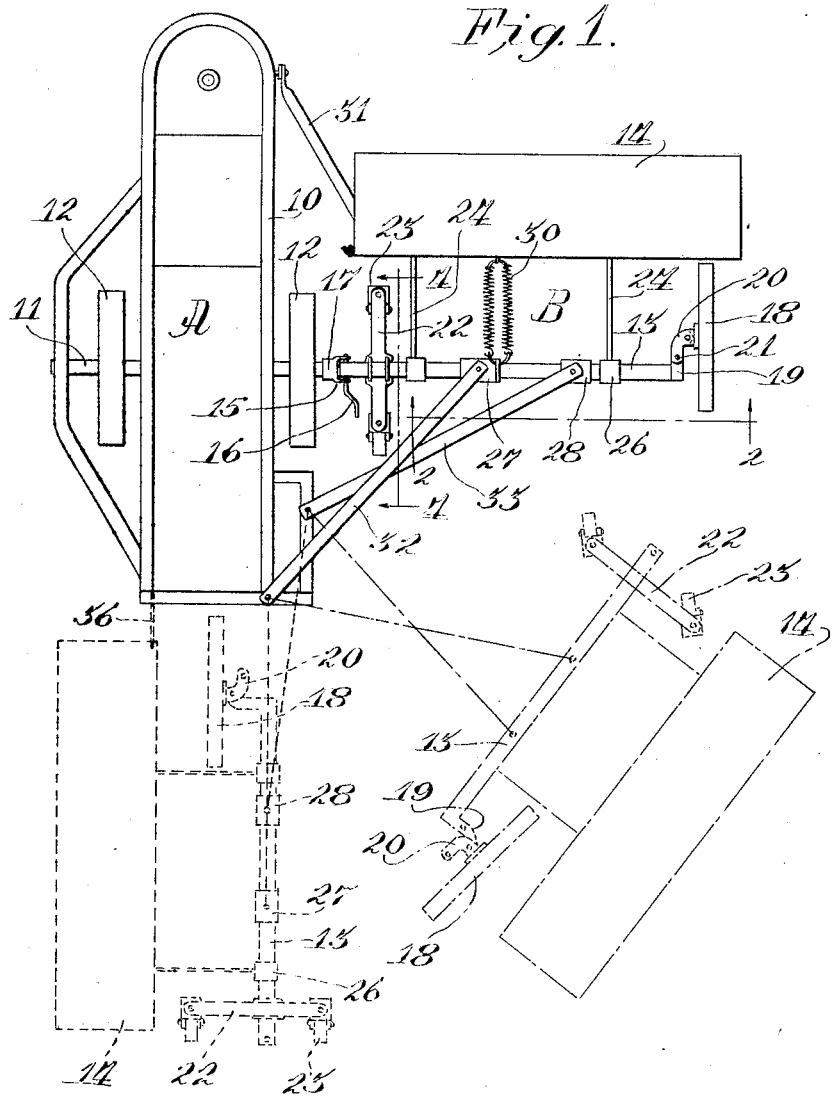

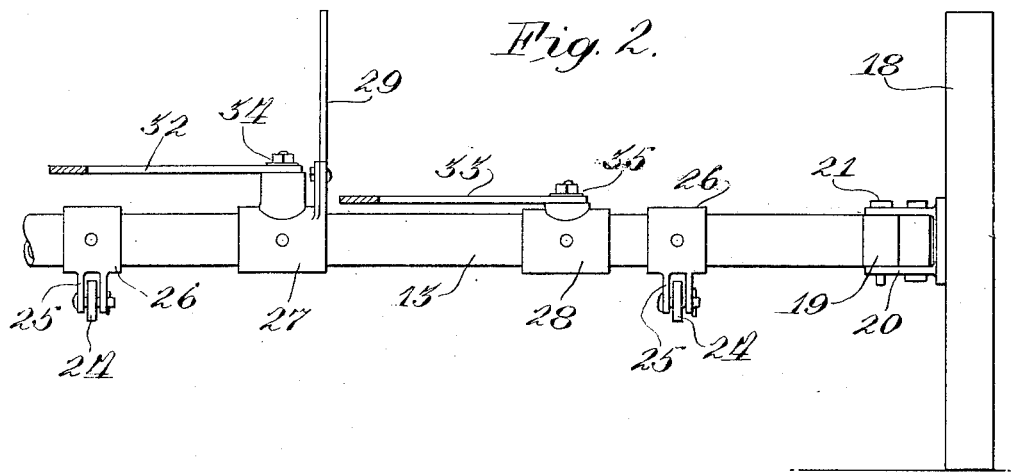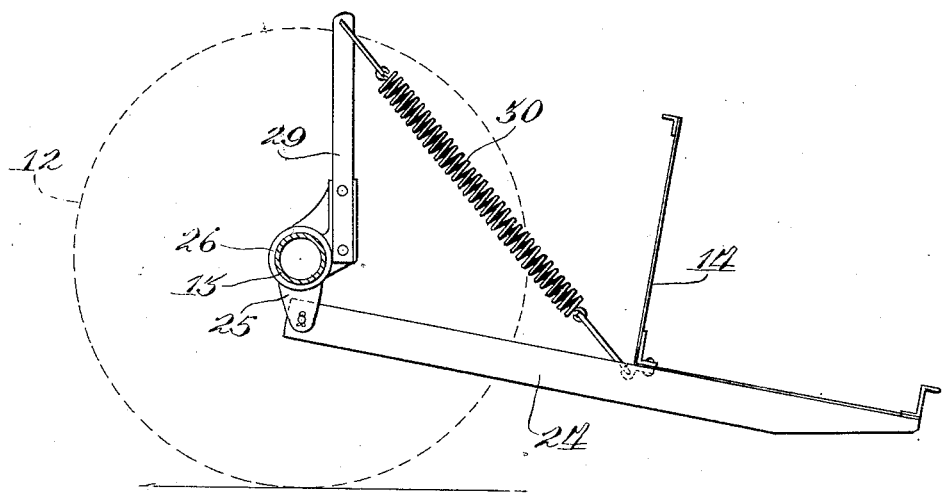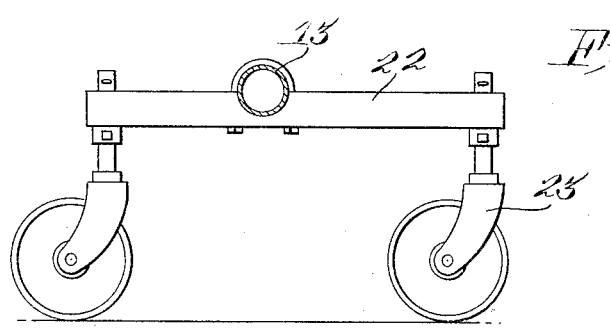

UNITED STATES PATENT OFFICE

VICTOR F. LASSAGNE, OF WILMETTE, ILLINOIS, ASSIGNOR TO INTERNATIONAL HARVESTER COMPANY, A CORPORATION OF NEW JERSEY

HARVESTER THRASHER COUPLING

Application filed August 24, 1929. Serial No. 388,115.

The present invention relates to combined harvesting and thrashing machines and is directed more particularly to improvements in the manner in which the two sections or machine frames ordinarily present in apparatus of that class are associated.

Harvester-thrashers of conventional form comprise a thrasher section and a laterally positioned harvester section extending at right angles to the longitudinal axis of the thrasher section when in operating position, the whole apparatus having an over-all width much too great to pass through ordinary farm gates and travel over roads of usual width. Therefore, it is the practice to hinge the harvester section to the side of the thrasher section in such a way as to permit it to be folded alongside the thrasher section to reduce the width of the apparatus for transport purposes, or, in other cases, the harvester section is completely removed from its connections at the side of the thrasher section, placed on transport means, and hitched behind the thrasher section so that the longitudinal axes of the two sections are substantially in alignment, thereby cutting down the width for transport to substantially the width of the thrasher section. The latter expedient gives a minimum transport width, and it is the principal object of this invention to retain this advantage while providing a permanent form of connection between the two sections of the apparatus that will permit the harvester section to be swung from its operating position to a transport position where it will lie within the same transverse zone as the thrasher section and vice versa, thus eliminating the time, labor, and other disadvantages incident to complete disconnection of the two frames and rearrangement for transport.

Another object of the invention is to provide a form of swingable connection between the two sections that will act as a brace or support for the harvester section when in operating position and as a draft connection when in transport position.

These objects as well as other objects and advantages, which will become evident upon further disclosure of the invention, are attained by employment of a novel form and arrangement of pivoted coupling bars between the thrasher frame and the harvester frame as is hereinafter more specifically set forth and illustrated in the accompanying drawings, where:

Figure 1 is a plan view of a harvester-thrasher assembly embodying the invention and with movements of the harvester section illustrated in broken lines;

Figure 2 is a sectional rear elevation on the line 2—2, Figure 1, drawn on an enlarged scale;

Figure 3 is a transverse vertical section through the harvester section; and,

Figure 4 is a detail sectional view on the line 4—4, Figure 1.

In Figure 1 there is shown, largely in outline, the thrasher section A and the harvester section B of a harvester-thrasher. The harvester section is shown as comprising the usual frame structure 10 supported on a transverse axle 11 and ground wheels 12. The harvester section is shown as comprising an elongated supporting member or pipe 13, and a platform 14 carrying the usual header sickle, reel, and conveyer (not shown). The support 13 is hinged at its inner end to the end of the axle 11 of the thrasher section for vertical floating movement. The hinge connection, shown at 15, is of a quick disconnectible type and is here shown as comprising a pintle having a crank end 16. This pintle passes through a bearing opening in the end of the member 13 and has threaded connection with openings in the arms of a yoke piece 17 secured on the end of axle 11. At its outer end, the support 13 is carried on a ground wheel 18. This wheel is pivoted to the end of a forward extension 19, at the end of support 13, on a vertical axis and is normally held against movement on this pivot by arms 20 which enclose the extension 19 and are locked thereto by a removable pin 21 received in aligned apertures in the extension and arms. At its inner end this member 13 has secured to it a cross-piece 22, which will preferably have the greater part of its length extending in the space between the member 13 and the platform 14, as seen in Figures 1 and 4. The ends of the cross-piece 22 are formed with vertical bearings receiving the standards of caster wheels 23, which are free to swivel. The purpose of extending bar 22 towards the platform 14, together with the similar extension 19 at the other end of support 13, is to locate the wheel supports in the best position to resist torsional stress and tipping of the harvester section due to weight of the platform 14.

The platform 14 is preferably connected to support 13 by push bars 24, the rear ends of which are pivoted to depending ears 25 on collars 26 fixed on the support 13. The support 13 also has fixed to it, a pair of spaced pivot sleeves 27 and 28, and the sleeve 27 is provided with a rigid vertical standard 29 carrying the platform suspension spring 30, by which the platform 14 is supported at the desired distance from the ground level. A draft link 31 may detachably connect the inner end of platform 14 to the forward end of the thrasher section and it will be understood that the usual disconnectible conveyer, reel and sickle driving connections (not shown) between the thrasher section and the harvester section will be provided.

The permanent connections between the thrasher section and the harvester section consist of coupling bars 32 and 33. The rear ends of these bars are pivoted on vertical axes to the rear portion of the thrasher frame at points spaced in a fore and aft direction and preferably offset from each other laterally. These bars extend forwardly and outwardly on intersecting lines, and their forward ends are pivoted to studs 34 and 35 on the sleeves 27 and 28 secured on the support 13. To obviate interference to free swing of the bars on their pivots, the bar 32 is spaced above bar 33, as best seen in Figure 2. The length of the coupling bars 32, 33 and the spacing of the pivots of the bars on the respective frames is so gauged as to bring the harvester frame as close as practicable to the rear end of the thrasher frame when the harvester frame is transferred to its trailing position, as illustrated by the final dotted line position of that frame in Figure 1. When in trailing position, the harvester frame will be held there by a supplemental supporting and draft link 36 which will detachably connect the forward end of the platform 14 to the thrasher frame, as shown.

In the operation of the invention, the harvester and thrasher sections will occupy the usual operating positions shown in full lines of Figure 1, in which position the coupling bars 32, 33 serve as supports or braces between the harvester section and the thrasher section. When it is desired to transfer the harvester section to transport position, the hinge connection at 15 will be released and the link 31 and driving connections also disconnected, as is the practice with prior art machines, and the pin 21 will be withdrawn to allow wheel 18 to caster. The links 32 and 33, however, will be left in position and the reel etc. left in position on the harvester section. The thrasher section can now be propelled forwardly and towards the left, which movement will cause the harvester section together with the coupling bars to swing outwardly through an arc of 270 degrees, in the manner illustrated in Figure 1, finally assuming the trailing position shown, or, the thrasher section can remain stationary and the harvester section can be moved around to trailing position by hand, as the caster wheel supports will offer little resistance to its movement. When in trailing position, it should be noted that the harvester frame will lie within the same longitudinal vertical planes as the thrasher frame, thereby giving the minimum possible width to the apparatus for transport. Also, it is to be noted that the final position of the caster wheels 18 and 23 is such as to support the harvester section against tilting due to unbalanced weight of the platform 14, which is further supported by the link 36.

The preferred embodiment of the invention above disclosed may be varied without departure from the scope of the invention as defined in the following claims.

What is claimed is:

1. In a harvester-thrasher, the combination of a thrasher frame, a harvester frame normally positioned adjacent the thrasher frame, and swingable coupling means permanently pivotally connected to both the thrasher and harvester frames and movable on said pivotal connections to transfer said frame from its normal position to a transport position in which the harvester frame lies between the same longitudinal vertical planes as the thrasher frame.

2. In a harvester-thrasher, the combination of a thrasher frame, a harvester frame having a working position at one side of the thrasher frame, means connecting the frames for swinging movement of the harvester frame in a horizontal path from side to rear of the thrasher frame, and means comprised in said connecting means for causing angular movement of the harvester frame horizontally during progress of said swinging movement.

3. In a harvester-thrasher, the combination of a thrasher frame, a harvester frame normally extending at right angles from one side of the thrasher frame, means connecting the frames for swinging movement of the harvester frame in a horizontal path from side to rear of the thrasher frame to a trailing position, and means comprised in said connecting means for causing angular movement of the harvester frame horizontally through an arc of substantially two hundred seventy degrees during progress of said swinging movement.

4. In a harvester-thrasher, the combination of a thrasher frame, a harvester frame normally extending outwardly from one side of the thrasher frame, and swingable connecting means permanently pivotally connected to both the thrasher and harvester frames on vertical axes and movable on said pivotal connections to transfer said frame from its normal position to a transport position behind the thrasher frame and between the longitudinal vertical planes within which the thrasher frame lies.

5. In a harvester-thrasher, the combination of a thrasher frame, a harvester frame normally extending outwardly from one side thereof, and connecting means pivoted to the thrasher frame and to the harvester frame and swingable on said pivots to move the harvester frame from its position at one side of the thrasher frame to a trailing position behind it.

6. In a harvester-thrasher, the combination of a thrasher frame, a harvester frame normally extending outwardly from one side thereof, and a plurality of coupling bars pivotally connected to the rear portion of the thrasher frame and to the harvester frame and swingable with the harvester frame on the pivots of the bars to the respective frames from its position at one side of the thrasher frame to a trailing position behind it.

7. In a harvester-thrasher, the combination of a thrasher frame, a harvester frame normally extending outwardly from one side of the thrasher frame, means for releasably connecting the inner end of the harvester frame to the thrasher frame, and a pair of forwardly and outwardly extending crossed coupling bars pivotally connected at their rear ends to the thrasher frame and pivoted to the harvester frame at their forward ends.

8. In a harvester-thrasher, the combination of a thrasher frame, a harvester frame normally extending outwardly from one side of the thrasher frame, means for releasably connecting the inner end of the harvester frame to the thrasher frame, and a pair of forwardly and outwardly extending crossed coupling bars pivotally connected at their rear ends to the rear portion of the thrasher frame at points spaced in a fore and aft direction and pivoted to the rear portion of the harvester frame at laterally spaced points.

9. In a harvester-thrasher, the combination of a thrasher frame, a harvester frame normally extending outwardly from one side of the thrasher frame and comprising an elongated supporting member, caster wheel supports at the inner and outer ends of said member, means for releasably connecting the inner end of said member to the thrasher frame, and a pair of forwardly and outwardly extending crossed coupling bars pivotally connected at their rear ends to said side of the thrasher frame at points spaced in a fore and aft direction and pivoted to the elongated member of the harvester frame at spaced points in the length thereof.

10. In a harvester-thrasher, the combination of a thrasher frame, a harvester frame normally positioned at one side of the thrasher frame with its longitudinal axis in angular relation to the longitudinal axis of the thrasher frame, and permanent coupling means connecting said frames for relative translative movement and acting during movement to swing the harvester frame from normal position to a trailing position rearwardly of the thrasher frame with the longitudinal axis of the harvester frame extending in the direction of the longitudinal axis of the thrasher frame.

11. In a harvester-thrasher, the combination of a thrasher frame, a harvester frame normally positioned at one side of the thrasher frame with its longitudinal axis in angular relation to the longitudinal axis of the thrasher frame, permanent coupling means connecting the frames for translative movement of the harvester frame from side to rear of the thrasher frame, and means comprised in said coupling means for causing the harvester frame to turn about an upright axis during translative movement.

In testimony whereof I affix my signature.

VICTOR F. LASSAGNE.